US010759381B2

(12) United States Patent
Jaradi et al.

(10) Patent No.: US 10,759,381 B2
(45) Date of Patent: Sep. 1, 2020

(54) VEHICLE SEAT BELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 16/105,082

(22) Filed: Aug. 20, 2018

(65) Prior Publication Data

US 2020/0055484 A1 Feb. 20, 2020

(51) Int. Cl.
*B60R 22/46* (2006.01)
*B60R 22/34* (2006.01)

(52) U.S. Cl.
CPC .. *B60R 22/4676* (2013.01); *B60R 2022/3402* (2013.01)

(58) Field of Classification Search
CPC ............ B60R 22/3413; B60R 22/4676; B60R 2022/286; B60R 2022/3402; A62B 35/00; A62B 35/04
See application file for complete search history.

(56) References Cited

U.S. PATENT DOCUMENTS

| | | | | |
|---|---|---|---|---|
| 4,256,273 A | * | 3/1981 | Burleigh | B60R 22/34 242/376 |
| 6,336,606 B1 | * | 1/2002 | Smithson | B60R 22/34 242/376 |
| 2007/0158487 A1 | * | 7/2007 | Glinka | B60R 22/3413 242/379.1 |
| 2015/0210247 A1 | * | 7/2015 | Liu | B60R 22/3413 242/379.1 |

FOREIGN PATENT DOCUMENTS

WO 2017011304 A1 1/2017

* cited by examiner

*Primary Examiner* — Sang K Kim
(74) *Attorney, Agent, or Firm* — Frank A. MacKenzie; Bejin Bieneman PLC

(57) ABSTRACT

A seat belt retractor includes a core having an outer surface, a cover having an inner surface facing the outer surface. and a plurality of tubes between the cover and the core. The plurality of tubes is deformable relative to at least one of the core and the cover. Each tube has an outer periphery. The entire periphery of each tube is movable relative to the outer surface and the inner surface.

15 Claims, 7 Drawing Sheets

US 10,759,381 B2

VEHICLE SEAT BELT RETRACTOR

BACKGROUND

Restraint systems in vehicles typically include a seat belt system. The seat belt system restrains an occupant during a vehicle impact. The seat belt system may include a seat belt retractor that locks a webbing to restrain the occupant. The seat belt retractor may include a torsion bar that deforms during the vehicle impact to allow additional payout of the webbing. The torsion bar allows additional payout of the webbing based on the deformation characteristics of the torsion bar. The additional payout of the webbing may reduce chest compression on the occupant of the vehicle.

DETAILED DESCRIPTION

Figure 1:
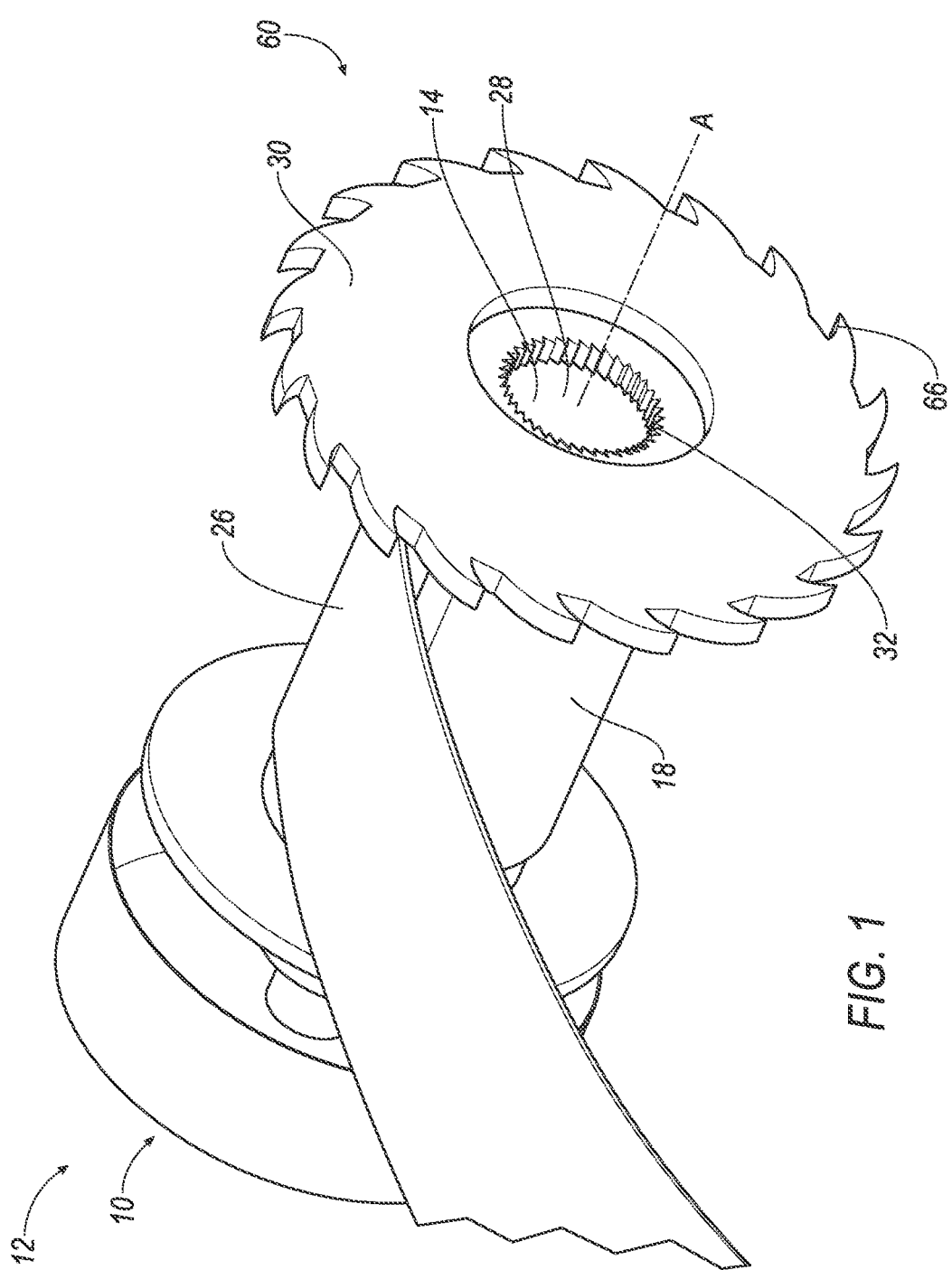
FIG. 1 is a perspective view of a seat belt retractor.

A seat belt retractor includes a core having an outer surface, a cover having an inner surface facing the outer surface, and a plurality of tubes between the cover and the core and deformable relative to at least one of the core and the cover, each tube having an outer periphery, the entire periphery of each tube being movable relative to the outer surface and the inner surface.

The seat belt retractor may further include webbing extending from the cover.

The cover may define a slot, and the webbing may extend through the slot.

The cover may be deformable relative to the core.
The cover may be a sheet.
The cover may be a wire wound around the tubes.
The tubes may include a first layer of tubes concentric about the core and a second layer of tubes concentric about the first layer of tubes.

Each tube may have a diameter, and the respective diameter of each tube in the first layer of tubes may be greater than the respective diameter of each tube in the second layer of tubes.

Each tube may have a deformation strength, and the respective deformation strength of each tube in the second layer of tubes may be lower than the respective deformation strength of each tube in the first layer of tubes.

Each tube may include a bore and a deformable material disposed in the bore.

Each tube may be cylindrical.

The tubes may be arranged circumferentially around the core.

The plurality of tubes may include a first tube and a second tube deformable relative to the first tube.

The core may be rotatable about an axis and the tubes may be elongated along the axis.

The seat belt retractor may further include an inertia lock releasably engageable with the core.

With reference to the Figures, wherein like numerals indicate like parts throughout the several views, a seat belt retractor 10, 100, 200, 300, 400, 500 in a vehicle 12 includes a core 14 having an outer surface 16, a cover 18, 56 having an inner surface 20 facing the outer surface 16, and a plurality of tubes 22, 42, 48, 52 between the cover 18, 56 and the core 14. The plurality of tubes 22, 42, 48, 52 is deformable relative to at least one of the core 14 and the cover 18, 56. Each tube 22, 42, 48, 52 has an outer periphery 24. The entire periphery 24 of each tube 22, 42, 48, 52 is movable relative to the outer surface 16 and the inner surface 20.

In a vehicle impact, webbing 26 wrapped around the cover 18, 56 compresses the cover 18, 56, deforming the plurality of tubes 22, 42, 48, 52. The deformation of the tubes 22, 42, 48, 52 absorbs energy from the webbing 26 and allows the webbing 26 to extend farther as a vehicle occupant moves forward during the impact, i.e., allows for controlled payout of the webbing 26. This may, for example, reduce chest compression. The deformation of the tubes 22, 42, 48, 52 is progressive. In other words, as the tubes 22, 42, 48, 52 collapse, the force required to further collapse the tubes 22, 42, 48, 52 increases. This results in increased resistance to the payout of the webbing 26 as additional webbing 26 is paid out.

As shown in FIGS. 1-9, the seat belt retractor 10, 100, 200, 300, 400, 500 includes the core 14. The webbing 26 is spooled about the core 14, storing the webbing 26 when not in use by the occupant. The webbing 26 extends from the core 14 when used by the occupant. The core 14 may be any suitable material, e.g., a metal, a polymer, a composite, etc. The core 14 may be substantially rigid, i.e., resists deformation when the webbing 26 applies a load. The core 14 includes the outer surface 16. During the vehicle impact, the core 14 remains stationary while the webbing 26 wraps around the core 14.

The core 14 is rotatable about an axis A. The core 14 provides a rotatable base from which the webbing 26 extends and around which the webbing 26 spools. As the webbing 26 is pulled by the occupant, the core 14 rotates to allow the webbing 26 to extend. When the occupant returns the webbing 26, the core 14 rotates to spool the webbing 26 around the core 14.

Figure 2:
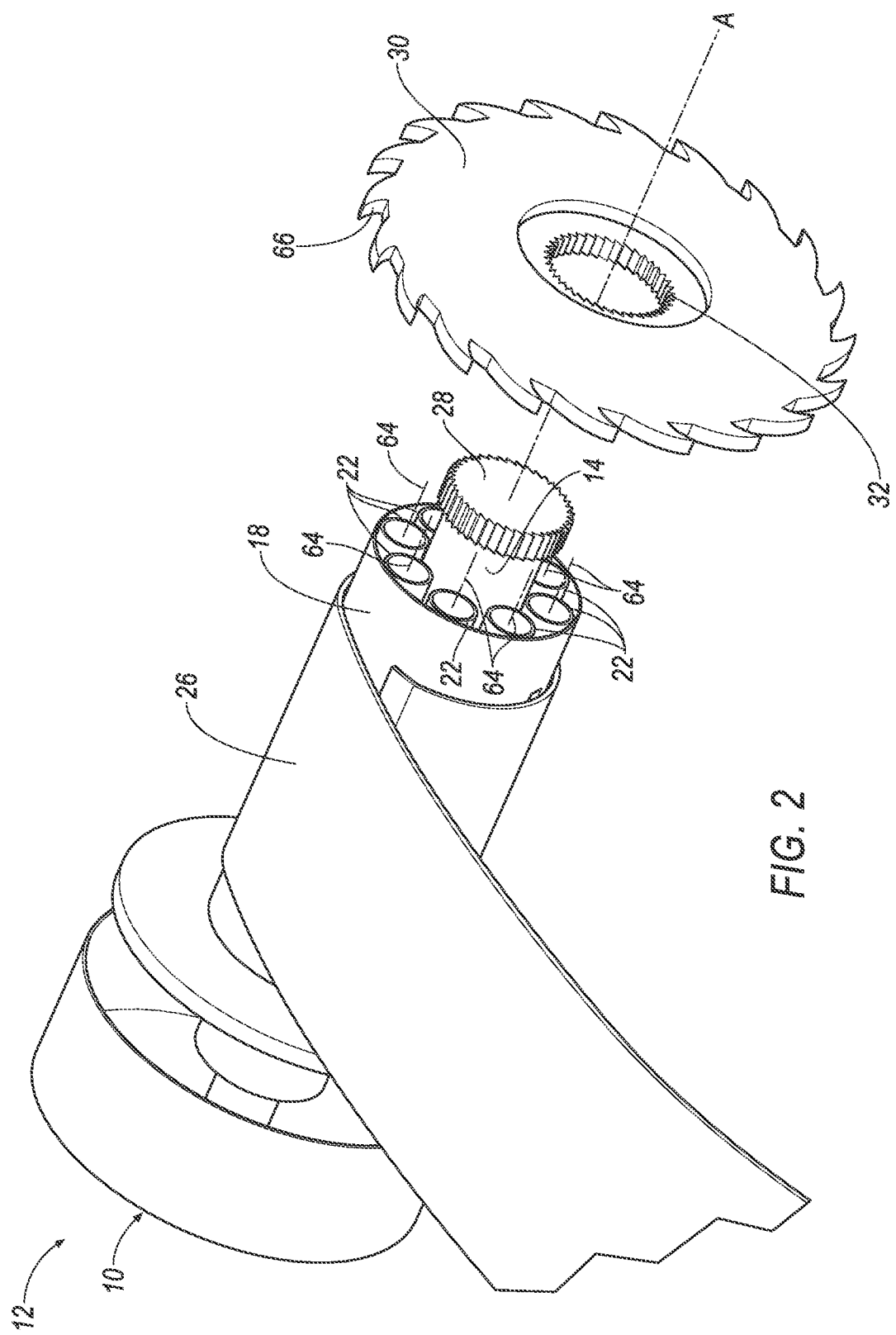
FIG. 2 is an exploded view of the seat belt retractor.
Figure 3A:
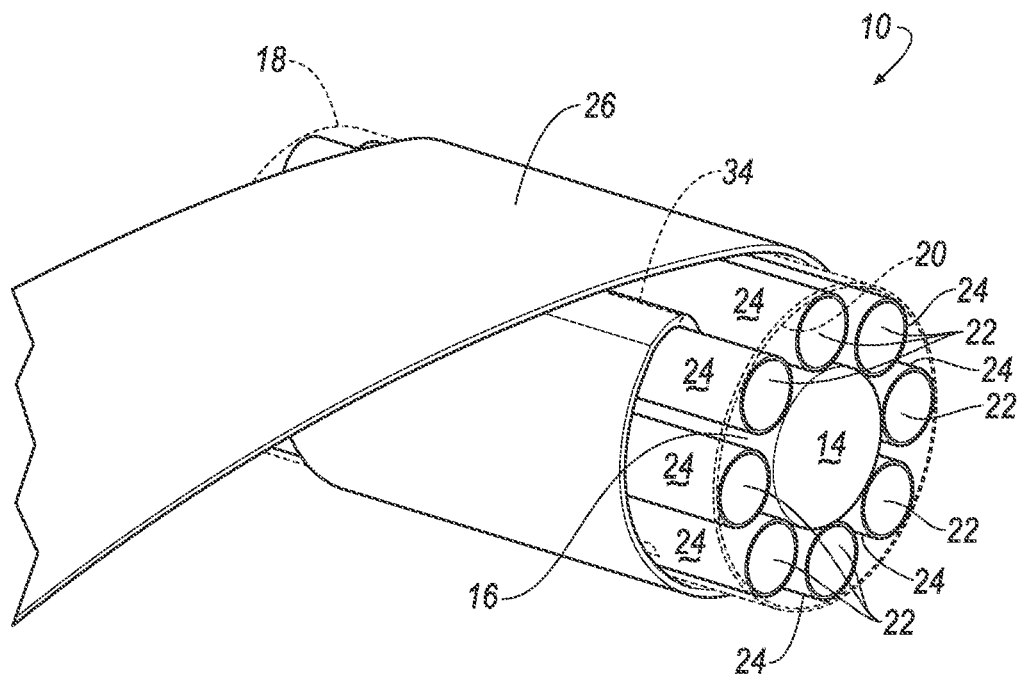
FIG. 3A is a perspective view of a core and a webbing.
Figure 3B:
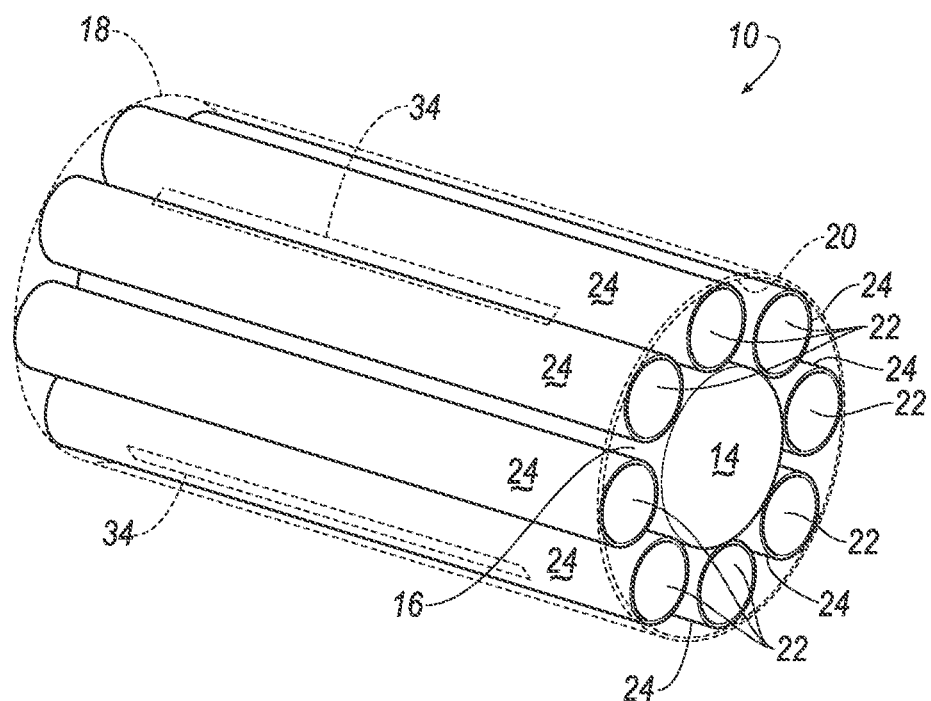
FIG. 3B is a perspective view of the core and a cover.

As shown in FIGS. 1-2, the core 14 may include a serrated cap 28. The serrated cap 28 may mate with a serrated edge 32 in a ratchet plate 30, as described below and shown in FIGS. 1-2. When the serrated cap 28 mates with the serrated edge 32, rotation of the core 14 rotates the ratchet plate 30, and rotation of the ratchet plate 30 rotates the core 14.

Figure 6:
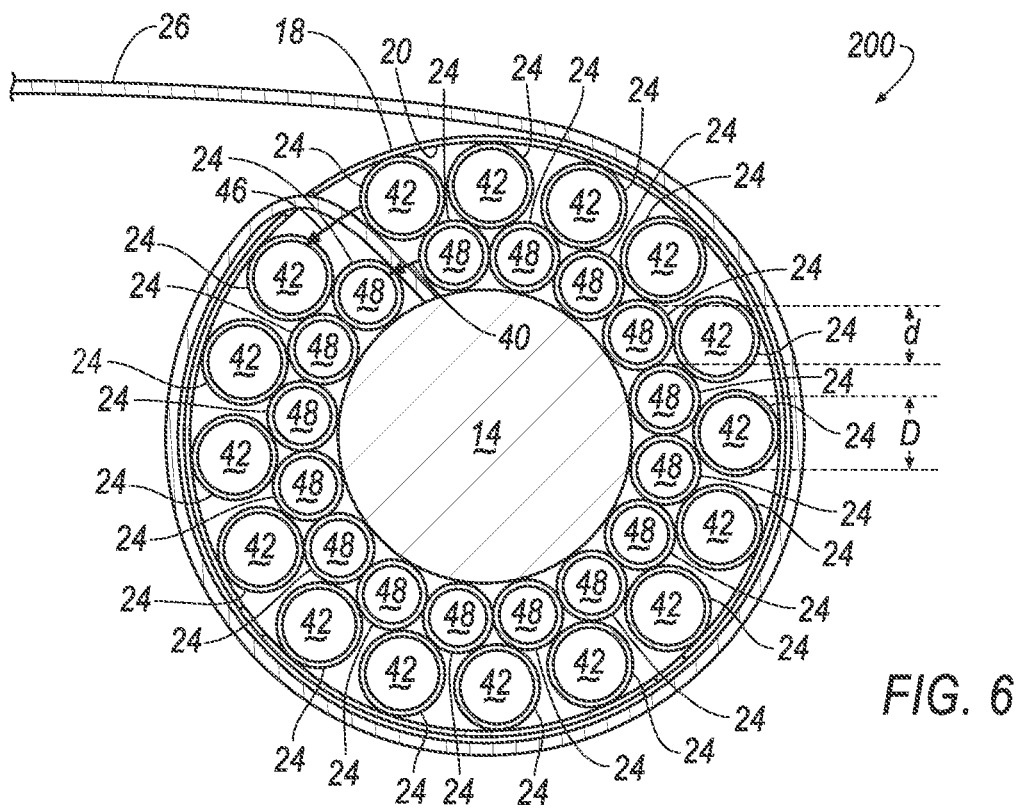
FIG. 6 is a side view of a third embodiment of the seat belt retractor including a second embodiment of the first layer of tubes and the second layer of tubes.
Figure 7:
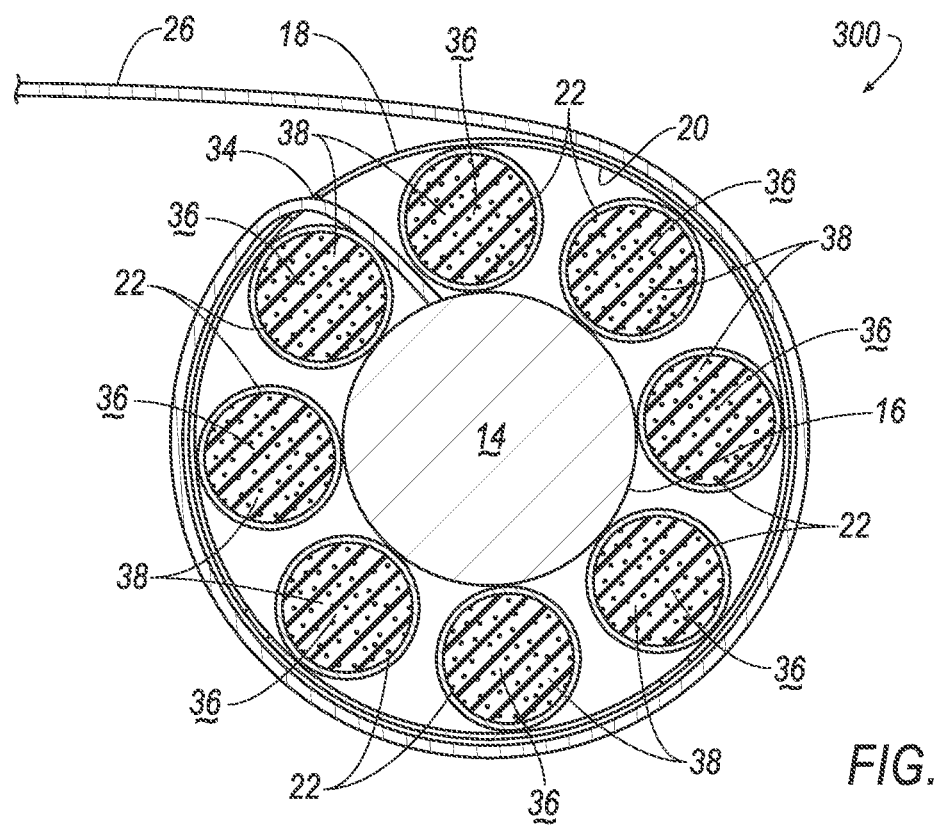
FIG. 7 is a side view of a fourth embodiment of the seat belt retractor including a plurality of tubes with deformable material.
Figure 8:
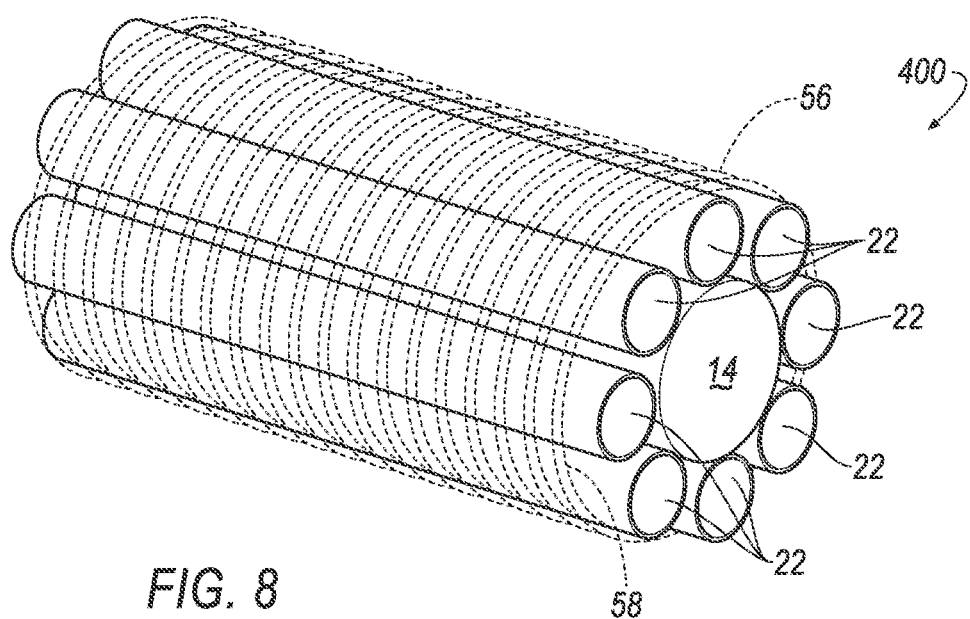
FIG. 8 is a perspective view of a fifth embodiment of the seat belt retractor including a second embodiment of the cover.

As shown in FIGS. 1-9, the seat belt retractor 10, 100, 200, 300, 400, 500 includes the cover 18, 56. The cover 18, 56 encircles the core 14. The cover 18, 56 may be deformable relative to the core 14. The inner surface 20 of the cover 18, 56 faces the outer surface 16 of the core 14. The cover 18 may be a sheet, i.e., a film of material. As another example, as shown in FIG. 8, the cover 56 may be constructed as a wire wound around the core 14. The cover 18, 56 may be a flexible material, e.g., a polymer, a composite, etc.

As shown in FIGS. 1-3A and 4A-9, the seat belt retractor 10, 100, 200, 300, 400, 500 may include the webbing 26. The webbing 26 secures the occupant to a vehicle seat (not shown) during the impact. The webbing 26 may extend from the core 14. The webbing 26 may spool around the core 14. The webbing 26 may be mounted to the core 14, i.e., fixed directly to the outer surface 16 of the core 14. The webbing 26 may be constructed of, e.g., a fabric, a polymer, a composite, etc.

The webbing 26 extends from the core 14 through the cover 18 and is wound around the cover 18. This ensures that the compressive force due to the extraction of the webbing 26 is uniformly applied to the cover 18 and the tubes 22, 42, 48, 52. As an example, the cover 18 may define a slot 34, as shown in FIGS. 3A-7 and 9. The slot 34 may be elongated along the axis A. In the example including the core 14, the webbing 26 extends through the slot 34. The slot 34 may be designed to allow the webbing 26 to extend from the core 14 out past the cover 18. The slot 34 allows the webbing 26 to spool around the cover 18 and remain mounted to the core 14.

The cover 18 may include a plurality of slots 34 spaced from each other circumferentially about the cover 18. The slots 34 increases the flexibility of the cover 18 when compressed by the webbing 26.

As shown in FIGS. 2-9, the seat belt retractor 10, 100, 200, 300, 400, 500 includes the plurality of tubes 22, 42, 48, 52. The tubes 22, 42, 48, 52 may absorb energy during the vehicle impact. Each tube 22, 42, 48, 52 may be elongated along a tube axis 64 that is parallel to the axis A, as shown in FIG. 2. The tubes 22, 42, 48, 52 are disposed between the cover 18, 56 and the core 14. During the vehicle impact, the webbing 26 compresses the cover 18, 56, deforming the tubes 22, 42, 48, 52.

Figure 4A:
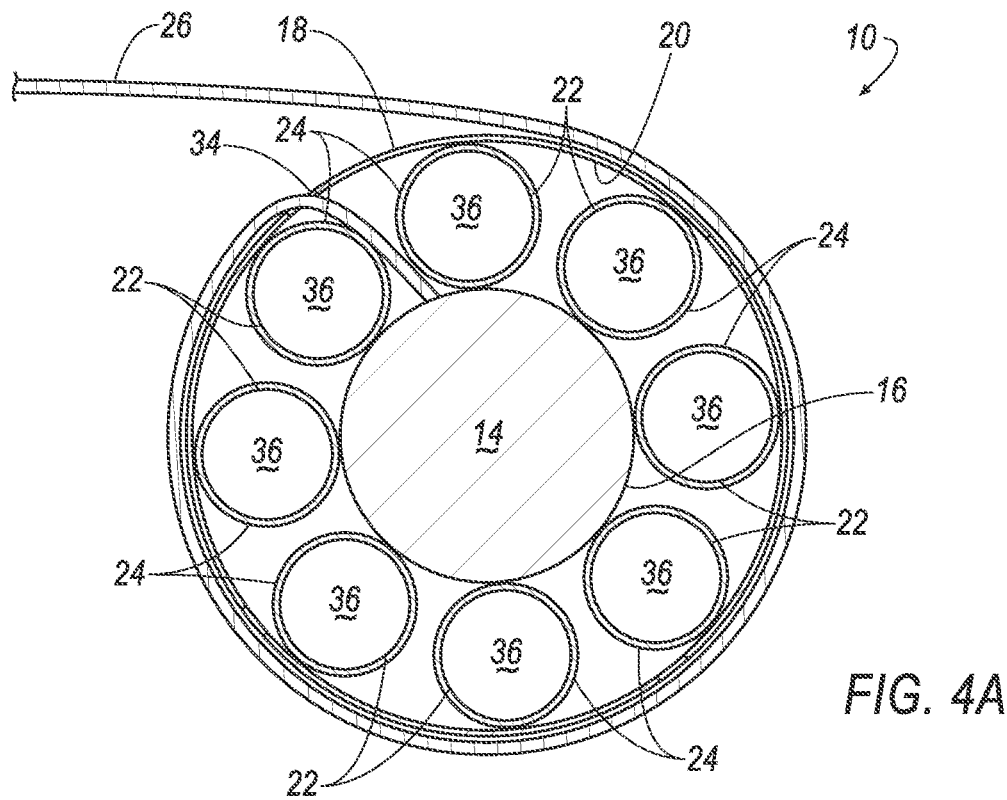
FIG. 4A is a side view of a plurality of tubes in the seat belt retractor.
Figure 4B:
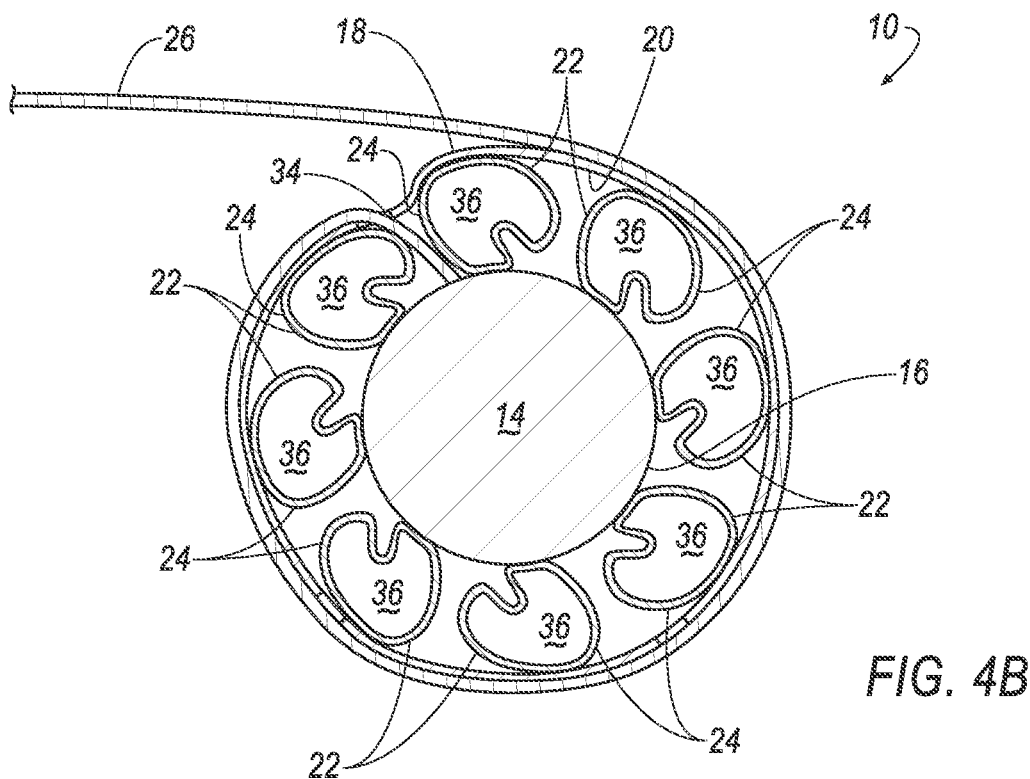
FIG. 4B is a side view of the plurality of tubes in a deformed state.

The tubes 22, 42, 48, 52 are deformable relative to at least one of the core 14 and the cover 18, 56, as shown in FIG. 4B. For example, the tubes 22, 42, 48, 52 are deformable relative to both the core 14 and the cover 18, 56. Each tube 22, 42, 48, 52 may have a deformation strength determined based on the material composition, size, and shape of the tube 22, 42, 48, 52. The deformation strength is a resistance to deformation, e.g., a stiffness, an elasticity, a toughness, a resilience, etc. Based on the deformation strength, the tubes 22, 42, 48, 52 may be designed to deform for specific vehicle impact loads. The energy absorption from the occupant and the payout of the webbing 26 may be optimized based on the size, position, and material construction of the tubes 22, 42, 48, 52.

Each tube 22, 42, 48, 52 has a respective outer periphery 24. The entire outer periphery 24 of each tube 22, 42, 48, 52 is movable relative to the outer surface 16 of the core 14 and the inner surface 20, 58 of the cover 18, 56. In other words, each tube 22, 42, 48, 52 is separate from the core 14 and from the cover 18, 56. During the vehicle impact, the outer periphery 24 may move relative to the outer surface 16 of the core 14 and/or the inner surface 20, 58 of the cover 18, 56. For example, the outer periphery 24 may roll and/or slide along the outer surface 16 of the core 14 and the inner surface 20, 58 of the cover 18, 56.

The cover 18, 56 extends around the tubes 22, 42, 48, 52, as shown in FIGS. 2-9. Because the tubes 22, 42, 48, 52 are separate from the core 14 and the cover 18, 56, the cover 18, 56 holds the tubes 22, 42, 48, 52 against the core 14. The cover 18 may be the sheet wrapped around the plurality of tubes 22, 42, 48, 52. In another example, as shown in FIG. 8, the cover 56 may be constructed as the wire wound around the tubes 22, 42, 48, 52.

The plurality of tubes 22, 42, 48, 52 may be arranged circumferentially around the core 14, as shown in FIGS. 2-9. The core 14 may be cylindrical, i.e., may define a circular cross section having a circumference. The tubes 22, 42, 48, 52 may be positioned around the core 14 in a substantially circular spacing. When the tubes 22, 42, 48, 52 are arranged circumferentially around the core 14, the webbing 26 may wrap around the cover 18, 56, deforming the tubes 22, 42, 48, 52 around the core 14 and absorbing energy from the vehicle impact. The tubes 22, 42, 48, 52 radially crush when deformed by the webbing 26.

Figure 9:
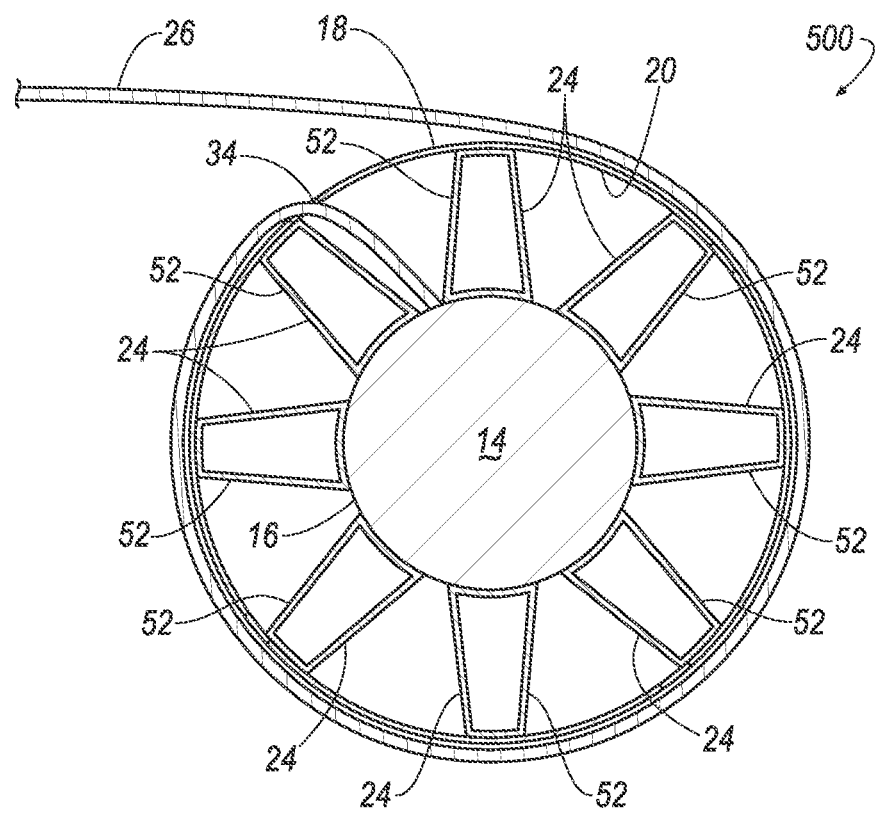
FIG. 9 is a side view of a sixth embodiment of the seat belt retractor with a plurality of polygonal cells.

Each tube 22, 42, 48 may be cylindrical, as shown in FIGS. 2-8. Each tube 22, 42, 48 may have a circular cross-section and define a diameter d, D. When the tube 22, 42, 48 is cylindrical, the tube 22, 42, 48 may rotate relative to the core 14 and the cover 18, 56 while deforming. As another example, as shown in FIG. 9, each tube 52 may be polygonal, e.g., trapezoidal, rectangular, triangular, etc.

Each tube 22 may define a bore 36, as shown in 4A-4B and 7. During the vehicle impact, the outer periphery 24 of the tube 22 may collapse, as shown in FIG. 4B, to absorb energy.

The tubes 22 may include a deformable material 38 disposed in the bore 36, as shown in FIG. 7. The deformable material 38 may fill the bore 36. The deformable material 38 absorbs energy during collapse of the tube 22. Specifically, the webbing 26 compresses the cover 18, as shown in FIG. 4B, which deforms the tube 22, which deforms the deformable material 38. The deformable material 38 may be, e.g., foam, pellets, rods, etc. While FIG. 7 shows the tube 22 defining the bore 36 with the deformable material 38, the tubes 42, 48, 52 may each define cavities that include deformable material 38.

Figure 5:
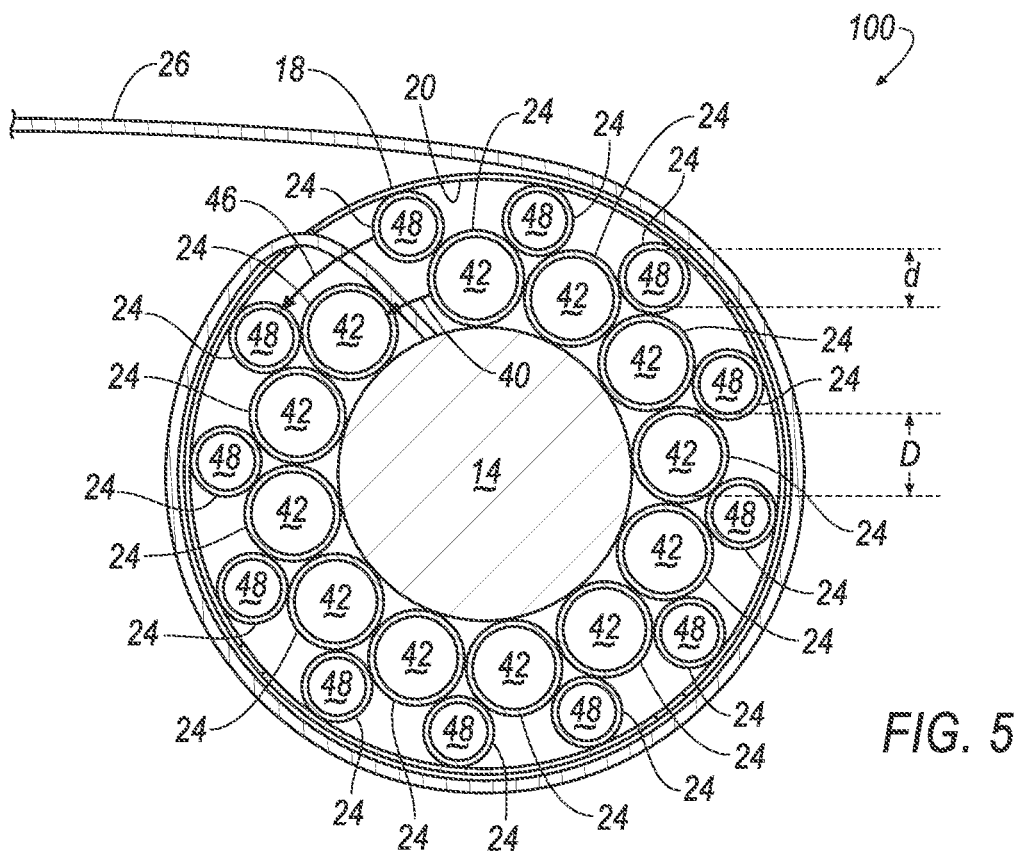
FIG. 5 is a side view of a second embodiment of the seat belt retractor including a first layer of tubes and a second layer of tubes.

At least some of the tubes 22, 42, 48, 52 may be deformable relative to others of the tubes 22, 42, 48, 52, i.e., a first tube of the plurality of tubes may be deformable relative to a second tube of the plurality of tubes. For example, the tubes 42 are deformable relative to the tubes 48 shown in FIGS. 5 and 6. The difference in deformability may be based on tube diameter, wall thickness, material, etc. For example, as shown in FIGS. 5 and 6, the tubes 42 each have a diameter D, and the tubes 48 each having a diameter d that is less than the diameter D of the tubes 42.

The tubes of the seat belt retractor 100 may be arranged in a first layer 40 concentric about the core 14 and a second layer 46 concentric about the first layer 40. In other words, the first layer 40 is outside of the core 14 and shares a common center with the core 14, and the second layer is outside of the first layer 40 and shares a common center with the first layer 40 and the core 14. As one example, the tubes in the first layer 40 may be deformable relative to the tubes of the second layer 46. As another example, the tubes in the second layer 46 may be deformable relative to the tubes of the first layer 40. With reference to FIG. 5, the first layer 40 may include tubes 42 and the second layer 46 may include tubes 48. As another example, with reference to FIG. 6, the first layer 40 may include tubes 48 and the second layer may include tubes 42. The respective diameters d, D of the tubes 42, 48 in the first layer 40 and in the second layer 46 may be determined to produce customized deformation characteristics of the tubes 42, 48 during the vehicle impact. As another example, the tubes of the first layer 40 and the second layer 46 may have a common diameter. As an example, the tubes of the first layer 40 and the second layer 46 may be identical to each other.

The tubes 22, 42, 48, 52 may be any suitable material. As an example, the tubes 22, 42, 48, 52 may be a high strength plastic, e.g., nylon, xenoy, etc. As another example, the tubes 22, 42, 48, 52 may be metal, e.g., aluminum, steel, etc.

The seat belt retractor 10, 100, 200, 300, 400, 500 may include an inertia lock 60, as shown in FIGS. 1-2. The inertia lock 60 may be releasably engageable with the core 14, i.e., the inertia lock 60 may allow the core 14 to rotate during vehicle operation and may lock the core 14 during the vehicle impact. The inertia lock 60 may include the ratchet plate 30. The ratchet plate 30 may include the serrated edge 32 which engages the serrated cap 28 of the core 14. As the core 14 rotates, the serrated cap 28 pushes against the serrated edge 32, rotating the ratchet plate 30. The ratchet plate 30 may include a toothed edge 66. The toothed edge 66 may engage a pawl (not shown) that prevents rotation of the ratchet plate 30 relative to a retractor base (not shown).

The serrated edge 32 of the ratchet plate 30 prevents rotation of the serrated cap 28 of the core 14, locking the core 14. Upon locking the core 14, the webbing 26 wraps around the cover 18, 56, deforming the cover 18, 56 and at least one of the tubes 22, 42, 48, 52. The inertia lock 60 prevents rotation of the core 14 while allowing additional payout of the webbing 26 only from rotation of the webbing 26 around the cover 18, 56 and deformation of the cover 18, 56 and at least one of the tubes 22, 42, 48, 52.

In operation, when the core 14 is prevented from rotating, for example by way of engagement of the inertia lock 60, the webbing 26 is pulled by the occupant. As the webbing 26 continues to be pulled, the webbing 26 exerts a radially compressive force on the cover 18, 56, which exerts a radially compressive force on the tubes 22, 42, 48, 52. In the event the radially compressive force on the tubes 22, 42, 48, 52 increase, the tubes begin to radially crush. As set forth above, this deformation of the tubes 22, 42, 48, 52 is progressive. In other words, as the tubes 22, 42, 48, 52 collapse, the force required to further collapse the tubes 22, 42, 48, 52 increases. This results in increased resistance to the payout of the webbing 26 as additional webbing 26 is paid out.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat belt retractor, comprising:
a core having an outer surface;
a cover having an inner surface facing the outer surface; and
a plurality of tubes between the cover and the core and deformable relative to at least one of the core and the cover, each tube having an outer periphery, the entire periphery of each tube being movable relative to the outer surface and the inner surface.

2. The seat belt retractor of claim 1, further comprising webbing extending from the cover.

3. The seat belt retractor of claim 2, wherein the cover defines a slot, and the webbing extends through the slot.

4. The seat belt retractor of claim 1, wherein the cover is deformable relative to the core.

5. The seat belt retractor of claim 1, wherein the cover is a sheet.

6. The seat belt retractor of claim 1, wherein the cover is a wire wound around the tubes.

7. The seat belt retractor of claim 1, wherein the tubes include a first layer of tubes concentric about the core and a second layer of tubes concentric about the first layer of tubes.

8. The seat belt retractor of claim 7, wherein each tube has a diameter, and the respective diameter of each tube in the first layer of tubes is greater than the respective diameter of each tube in the second layer of tubes.

9. The seat belt retractor of claim 7, wherein each tube has a deformation strength, and the respective deformation strength of each tube in the second layer of tubes is lower than the respective deformation strength of each tube in the first layer of tubes.

10. The seat belt retractor of claim 1, wherein each tube includes a bore and a deformable material disposed in the bore.

11. The seat belt retractor of claim 1, wherein each tube is cylindrical.

12. The seat belt retractor of claim 1, wherein the tubes are arranged circumferentially around the core.

13. The seat belt retractor of claim 12, wherein the plurality of tubes includes a first tube and a second tube deformable relative to the first tube.

14. The seat belt retractor of claim 1, wherein the core is rotatable about an axis and the tubes are elongated along the axis.

15. The seat belt retractor of claim 1, further comprising an inertia lock releasably engageable with the core.

* * * * *